United States Patent [19]

Plantes et al.

[11] 4,329,211
[45] May 11, 1982

[54] SIMPLIFIED MAINTENANCE ELECTROCOAGULATOR

[75] Inventors: William J. Plantes; Robert P. Goldstein, both of Pittsburgh; Jerome K. Wolfe, Export, all of Pa.

[73] Assignee: Westinghouse Electric Corporation, Pittsburgh, Pa.

[21] Appl. No.: 244,712

[22] Filed: Mar. 17, 1981

[51] Int. Cl.$^3$ .............................................. C02C 5/12
[52] U.S. Cl. .................................. 204/149; 204/152; 204/267; 204/269; 204/275
[58] Field of Search ............... 204/152, 1 R, 253, 252, 204/242, 222

[56] References Cited

U.S. PATENT DOCUMENTS

| | | | |
|---|---|---|---|
| 3,135,674 | 6/1964 | Ruetschi | 204/253 X |
| 3,222,269 | 12/1965 | Stanton | 204/242 X |
| 3,981,787 | 9/1976 | James et al. | 204/252 |
| 4,073,707 | 2/1978 | Spaziante et al. | 204/222 X |
| 4,121,993 | 10/1978 | Krugmann | 204/149 X |
| 4,123,339 | 10/1978 | Gale et al. | 204/149 |
| 4,123,345 | 10/1978 | Shettel | 204/149 X |

*Primary Examiner*—Arthur C. Prescott
*Attorney, Agent, or Firm*—LeBlanc, Nolan, Shur & Nies

[57] ABSTRACT

An improved method and apparatus for electrocoagulating waste water or fluids to remove colloidal suspensions therein is described. The apparatus includes at least one module having a plurality of closely spaced, flat electrodes defining a plurality of flow paths therebetween. Each pair of electrodes is separately mounted in the module and each electrode has a separate connection to a source of alternating current. Each pair may then be rapidly removed from the module for inspection, maintenance, or replacement or alternate pairs may be removed increasing the distance between the electrodes, if desired. The method allows the utilization of a fluidized bed of graphite particles to scrub the electrode faces, and it also permits the repelling forces on suspended solids to be broken on a continuous basis at relatively low current density in a collapsing field of alternating current. A relatively high volume flow rate of waste water or fluids may be rapidly and economically treated to remove contaiminants so that the treated waste water or fluid is suitable for disposal.

20 Claims, 13 Drawing Figures

Fig. 9  Typical data for variable flow rates. (160-400 gpm) 12-20 hr. test

Fig. 10

160 gpm flow rate. 12-20 hr. test

Fig. 11

200-330 gpm. 16-20 hrs. test

Fig.12
OVERPOWERING EFFECT ON TURBIDITY (160gpm)

Fig.13
FLOW RATE 380-400gpm

SIMPLIFIED MAINTENANCE ELECTROCOAGULATOR

This invention is related to the inventions described and claimed in U.S. Pat. Nos. 4,053,378, 4,094,755, and 4,176,038, assigned to the assignee of this invention, and accordingly the disclosures thereof are hereby incorporated by reference.

The above patents describe and claim a process and apparatus whereby waste water containing colloidal particles is introduced into a collapsing alternating current field between closely spaced, parallel, preferably aluminum, electrodes. Waste water generally is characterized as containing a wide range of particle size and densities as well as droplets of immiscible liquid impurities in emulsified form. As disclosed in the above patents establishing an alternating current circuit between electrodes and through the flow path causes coagulation, precipitation, separation or oxidation, permitting the subsequent agglomeration of colloidal size or larger particles of the heavy metals content or miscible fluids. After treatment the colloidal and larger particles agglomerate in a settling pond, tank, or mechanical device so that overflow water from the pond is suitable for disposal or usage. Fluid separation occurs in the residency containment, and entrapped gases are released to the atmosphere.

It is inherent then in the process described in the above patents that the settling of colloidal particles will be induced together with accelerated or natural settling of larger waste products entrained in the stream. Unfortunately, the larger particles will drop out of the waste water flow randomly to deposit on any surface along the flow path. The deposits formed can fill narrow flow passages and eventually will retard, or even block, the normal flow.

In the apparatus of the aforementioned patents, a turbulent bed of graphite particles is maintained between the electrodes. The turbulent or fluidized bed improves conductivity and current efficiency and exerts a scrubbing action on the electrode faces to eliminate the build-up of scale. Scale on the electrode faces, as is well-known, rapidly reduces the current efficiency, and ultimately, requires shut-down and cleaning or replacement of the electrodes.

While the turbulent or fluidized bed of graphite particles will insure clean electrode faces and a relatively uniform electrical field therebetween, because the electrodes are closely spaced, suspended solids in the waste water tend to clog the flow path therebetween. Clogging can also occur in associated piping. Efficient operation then requires minimizing clogging of the flow path between the electrodes, and providing for rapid maintenance when clogging occurs.

A variety of electrode materials have been successfully used in the process of this invention. Aluminium, however, is preferred because it is amphoteric and will undergo electrolytic action in both acidic and alkaline media. In addition aluminium is sufficiently reactive even without electrical energization to form conversion products by reacting with a variety of chemical contaminants which may be found in waste water. Aluminium or whatever electrodes material is used will, of course, deteriorate in time, and require replacement. The results subsequently described in this invention are influenced by "catalytic" quantities of aluminium from electrode degeneration.

While this invention and the process and apparatus described in the above patents are primarily directed to breaking colloidal suspensions, some oxidation and/or coprecipitation has also been observed to occur. Metal contaminants present in the waste water such as iron have been oxidized to insoluble compounds in the apparatus of this invention which compounds ultimately settle out with the agglomerated solids or sludge.

One form of colloidal suspension which has presented a continuing problem from a disposal standpoint is waste water from coal cleaning. Coal pond water contains colloidal particles of clay, primarily, which will not settle out with time. Typically, a settling pond may contain suspended solids in a concentration averaging 300-500 parts per million whereas federal regulations require no more than 32 parts per million for disposal.

Underground mining of coal is accomplished with automatic machines which cut a uniform channel through the coal seam. Since the seam is not uniform in thickness, rock and clay become mixed in with the coal cut away by the machine. The "as mined" tonnage is crushed and then cleaned with water. The water washes out rock dust and clay from the coal. For example, in a mine test, the mine output was about 40% coal and 60% refuse. The coal flow was washed with water at a rate of 6,500 gallons per minute (gpm), and the wash water and refuse dumped into a thickener wherein the solids settle out and are pumped as a slurry to a pond. The water in this pond was found to contain an average suspended solid content of 308-342 ppm. Samples near the top of the pond were tested and found to contain 142 parts per million. The colloidal suspension, primarily clay, does not settle or precipitate with time. Therefore, the water from this pond could not be legally discharged because federal regulations require a solid content of no more than 32 parts per million for disposal.

The device of this invention, however, was used to electrocoagulate the suspended solids in water from the above pond. Tests results indicated that electrocoagulated pond water, as will be subsequently described, contained a spherical or sand-grain-like precipitate which settled out readily so that within 12 to 24 hours, clear water containing less than 32 parts per million suspended solids could be discharged. The heavy metal content of the water was also reduced to meet discharge standards.

The device of this invention, tested as above, consisted of three large modules connected in parallel each of which was fed with waste water at the bottom, and expelled treated water at the top. Each module consisted of 12 electrode cell assemblies separated from one another by a fiber glass barrier plate. Each cell consisted of a pair of trapezoidally shaped aluminium plates having a V-shaped notch cut at the top. Two electrode plates were bolted together on either side of a frame preferably of polyvinyl chloride to form a flow path therebetween. The two side members of the frame are solid, and upper and lower cross members are foraminous. Each frame and a pair of electrodes form a separate, removable cell assembly within each module. The upper and lower frame cross members are special purpose screens, machined to allow water to pass through but to retain the graphite bed particles. The screens have longitudinal grooves extending laterally about ½ the thickness thereof along one side. The other side of each screen has holes drilled to a depth just sufficient to break through the surfaces of the grooves.

The device of this invention was operated successfully both with and without a fluidized bed using coal mine wash water. The bed consisted of graphite particles of approximately $\frac{1}{8}''$ diameter and $\frac{1}{8}''$ to $\frac{1}{4}''$ long. The fluidized bed, as noted above improved current efficiency and achieved a scrubbing action against the electrode faces to prevent the build up of scale. However, it was observed that with this waste water the device, with fluidized bed, must be operated in a specific manner to avoid or minimize clogging. Suspended solids in the waste water were found to coat and agglomerate around the graphite particles during treatment.

Because the ponded coal preparation wash water contained particles of coal, slate or the like, it was discovered that the fluidized bed could be eliminated. The turbulent flow between the electrode faces of this waste water, containing these particles, provided the desired low resistance achieved with the fluidized bed of graphite particles. In addition, the turbulent flow was found to scrub the electrode faces in a similar fashion.

It should be emphasized however, that a fluidized bed of graphite particles and this waste water need not be an operating problem in the device of this invention. The power however, should be shut off before flow between the electrodes is stopped, and the channels between the electrodes should be flushed with water immediately after a shut down.

The device of this invention then provides a simplified and efficient maintenance capability with or without a fluidized bed in the flow paths between electrodes. In this device closely spaced electrodes may be used to treat colloidal suspensions without short circuiting or bridging between electrodes. If clogging occurs, if electrodes must be changed or inspected, or if it is necessary to increase the spacing between electrodes the unique design facilitates rapid action without prolonged down time.

In addition, it has been discovered that in the device of this invention current density and conductivity are related to the settling time of the floc produced and may be optimized at a desired current density for a given conductivity which is optimal between under and over power conditions. In an under power condition sufficient floc will not be generated during electrocoagulation, and prolonged settling times will be necessary. In an overpower situation a light and fluffy floc will be produced which settles very slowly. At optimum current density, however, a spherical floc will be generated which settles rapidly.

Different waste waters and fluids also exhibit different conductivities. For optimum operation then, in addition to control of current density at the electrodes, it may be necessary to change the electrode spacing. Without this accommodation, in highly conductive waste water a short circuit could occur between the normally closely spaced electrodes. The design of this invention facilitates such an accommodation. Conversely, if the water of fluid is highly resistant, an assembly of closer spaced electrodes, or a fluidized bed can be utilized.

The colloidal particles agglomerated by electrocoagulation according to the process of this invention were found to penetrate the faster settling entrained solids or solids already present in the pond bottom. The clays then precipitate out, and achieves a dewatering effect to densify the bottom sedimentation. This dewatering effect occurs underwater, and facilitates the clean-out of ponds. It also permits a larger volume of the pond to be used. The colloidal clays removed by the process of this invention then, were found to act similar to a cement grout. For example, clays precipitated in a resident pond exhibit a noticeable gray surface on the original black bottom. In time, the gray clay completely disappears into the black bottom.

Electrocoagulation powered by alternating current neutralizes the magnetic or electrostatic forces which hold particles in colloidal suspension. The sludge dewatering effect exhibited indicates the destruction of water bonding between large particles. Electrocoagulation, then, can be used to pretreat sludge before conventional vacuum or mechanical processes are used to reduce the moisture content thereof. A drier sludge cake for disposal is thereby produced with increased design thruput for the equipment employed. The properties imparted to treated water then beneficially affect process usage.

Electrocoagulator treated water or fluids exhibits an advantageous pH change toward the range of 6–9, a decrease in conductivity, and a resistance to contamination by additional colloids and solids. The process exhibits an oxidizing effect also on metallic and/or organic contaminants in the water. These advantages in the context coal preparation and the recycling of wash water therefor facilitate the elimination of colloidal clay buildup, the reduction or elimination of the use of chemical flocculents, enhanced separation of coal fines, and improved performance of screening equipment. Sludge handling and drying costs and plant maintenance costs are thereby also reduced.

Electrocoagulation according to the process of this invention is distinctly superior to chemical flocculation. The colloidal material coagulated by the process of this invention were found not to reform as colloids due to subsequent agitation such as a thermal upset of the settling pond. Chemical floc in contrast will colloids produced by the process of this invention were found not to reform as colloids due to agitation such as a thermal upset of the settling pond. Chemical floc in contrast will reappear in time, especially if the precipitate is agitated.

In addition, pumping was found to exhibit no adverse effect on settling rate or colloidal removal of water treated according to the process of the invention. In contrast, water treated with chemical flocculation agents loses its desired characteristics as pump induced, fluid shear forces act on the chemicals used. In fact, tests indicate that initial agitation of water treated according to the process of this invention after discharge into the pond, acts to enhance the rate of precipitation and the elimination of colloids.

Accordingly, it is an object of this invention to provide an improved electrocoagulator capable of treating high volumes of waste water or fluids at optimum current to produce desired results in less than 24 hours.

It is another object of this invention to provide an electrocoagulator which will treat waste water having colloidal clays therein at low or high volume flow rates as, for example, 200 gallons per minute per module, to subject the suspended solids therein to the collapsing field of alternating current whereby the suspending forces will be broken so that the colloidal particles will agglomerate and settle out.

It is another object of this invention to provide an electrocoagulator comprising a plurality of closely spaced electrode plates defining a plurality of flow paths therebetween which will rapidly treat high volumes of waste water by establishing an alternating current across electrodes and through a flow path therebetween.

It is another object of this invention to provide a simplified maintenance electrocoagulator whereby electrodes and associated piping may be rapidly inspected, cleaned, or replaced in the event of clogging whereby one or more pairs of electrodes may be removed without affecting the remaining electrodes.

It is yet another object of this invention to provide a method for producing a rapidly settling floc from waste water containing colloidal particles by subjecting said waste water to an alternating current field at an optimal current density at the electrode faces.

It is yet another object of this invention to provide a method for removing colloidal clay and suspended materials to a concentration of less than 32 parts per million or down to zero, depending upon the contaminants, and other process variables.

It is yet another object of this invention to provide a method for removing heavy metals or separating fluids from waste water or fluid flow including iron from mine acid flow streams, metallic elements from geothermal brine solutions, and fluid separation from ship bilge water.

These and other objects will become readily apparent with reference to the drawings and following description wherein.

Figure 1:
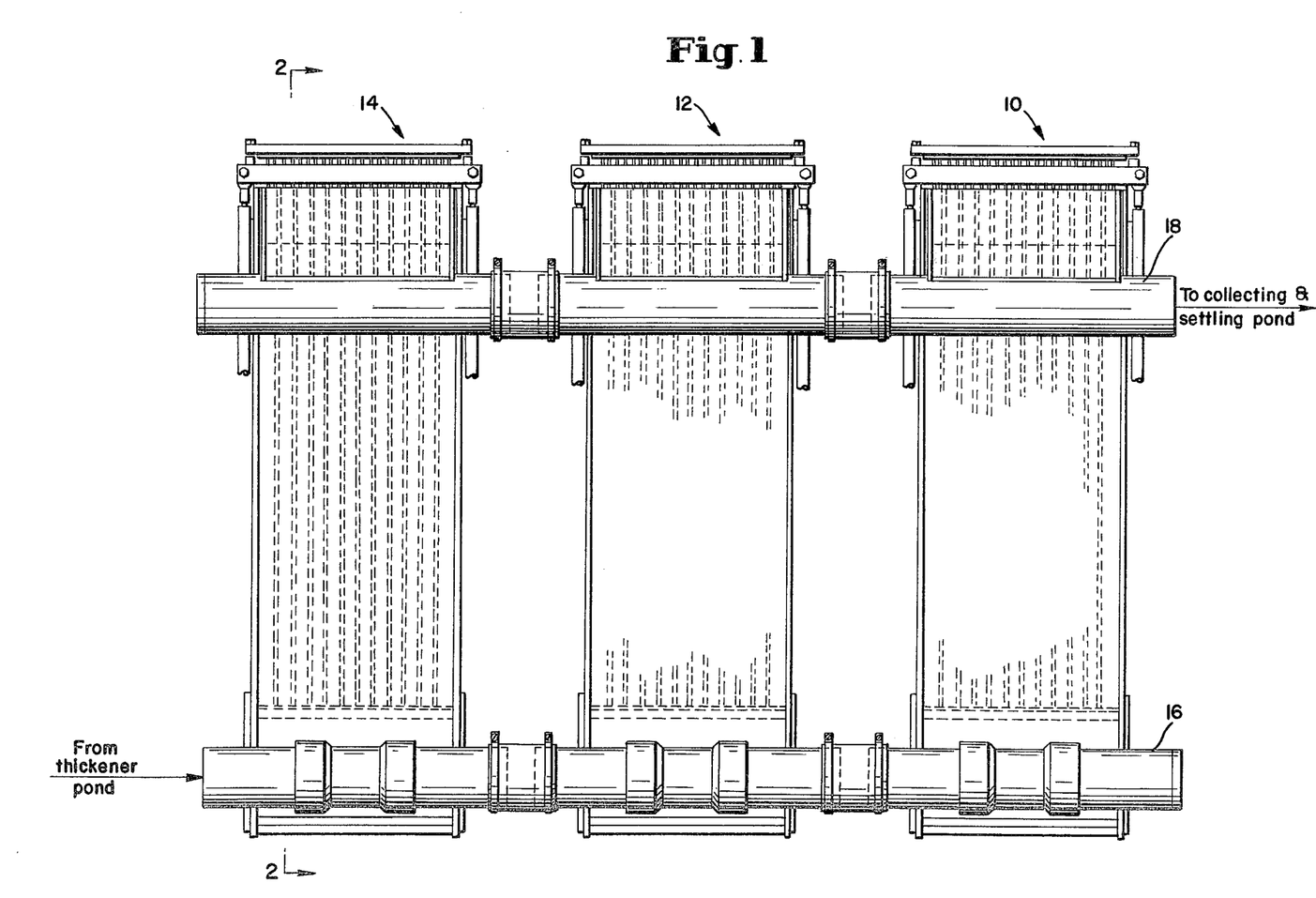
FIG. 1 is a plan view of a three module electrocoagulator of this invention.
Figure 4:
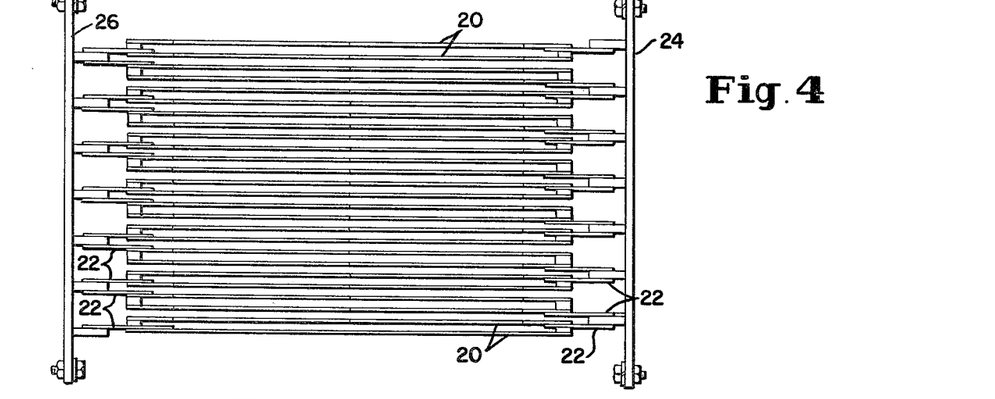
FIG. 4 is a plan view of the electrode plate arrangement removed from a module as shown in FIG. 1.

With attention to the drawings and to FIGS. 1 and 4 in particular, the device of this invention and the process thereof are those disclosed and claimed in the above U.S. Pat. Nos. 4,053,378; 4,094,755 and 4,176,038 with the improvements to be hereinafter described. The improvements of this invention include the discovery that a large volume flow rate of waste water or fluids may be treated in a plurality of closely spaced electrode cells without substantial risk of maintenance down time due to clogging. The device of this invention preferably includes three modules 10, 12 and 14. Each module is fed by a supply pipe 16 at the bottom thereof, and treated water is taken by a collection pipe 18 at the top thereof, as will be subsequently described.

Figure 2:
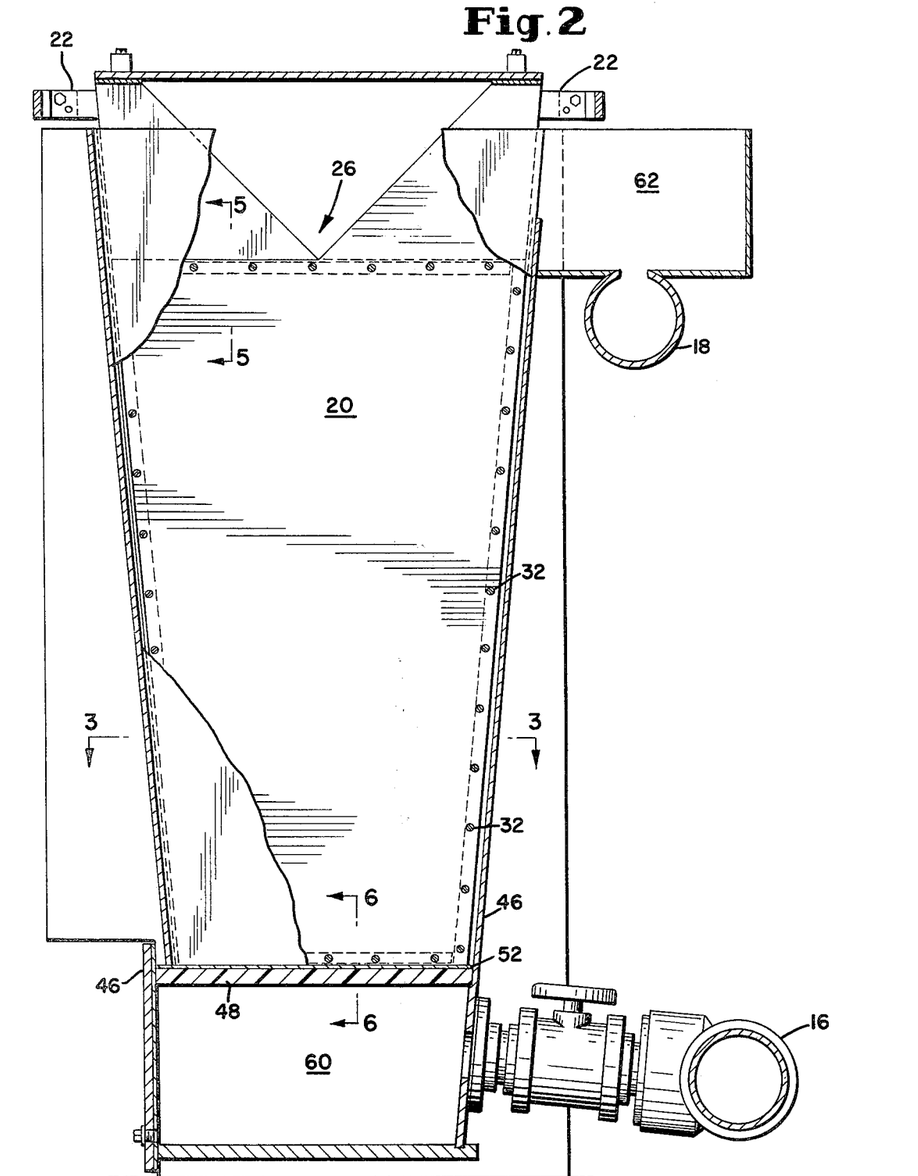
FIG. 2 is a cross section view taken along line 2—2 of FIG. 1.

With reference to FIG. 4, each module comprises, preferably, 12 pairs of electrodes 20. Each electrode is trapezoidally shaped as shown in FIG. 2, and mounts an integral ear 22 on an upper surface thereof. Each electrode is separately connected to a source of alternating current (not shown) at its ear 22. As shown in FIG. 4, members 24 and 26 supply alternating current from a remote source (not shown) to each of the ears 22 and electrodes 20 to complete a circuit across each electrode when waste water flows therebetween.

Accordingly, each pair of electrodes 20 in each module 10, 12 or 14 is separately connected to a source of electrical energy so that a pair of electrodes may be removed without altering the circuits across the remaining electrodes in a particular module.

Figure 3:
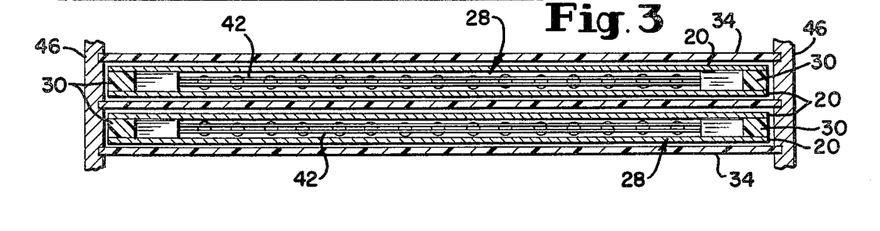
FIG. 3 is a cross section taken along line 3—3 of FIG. 2.

With attention to FIGS. 2 and 3, each electrode 20 is a trapezoidally shaped plate and each pair of plates forms a notch 26 in the upper portion thereof to permit collection of the treated water. Each electrode 20 is coupled with a comparison electrode 20 to form a mating assembly 28. Assembly 28, in addition to the parallel electrodes 20, includes rigid vertical frame members 30 which extend along the vertical sides of the electrodes. Frame members 30 then serve as insulating spacers to which each electrode 20 is affixed preferably by bolts 32. Frame members 30 may be constructed of any suitable material such as polyvinyl chloride plastic.

Each pair of electrodes is isolated within the module by a barrier plate 34 constructed preferably of fiberglass. Plates 34 then, divide the module 10, 12 or 14 into 12 separate electrode containing cells, each electrode in each cell being separately coupled to a source of alternating current.

With attention to FIGS. 5-8 the vertical frame members 30, as noted above, are solid and extend vertically along the sides of each electrode pair. Each frame also extends across the top and bottom of each pair of electrodes.

Figure 5:
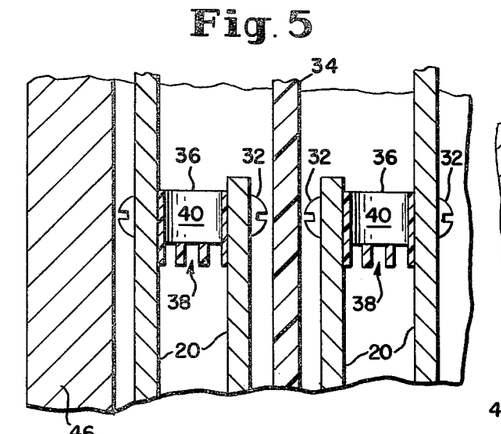
FIG. 5 is a cross section taken along line 5—5 of FIG. 2.
Figure 7:
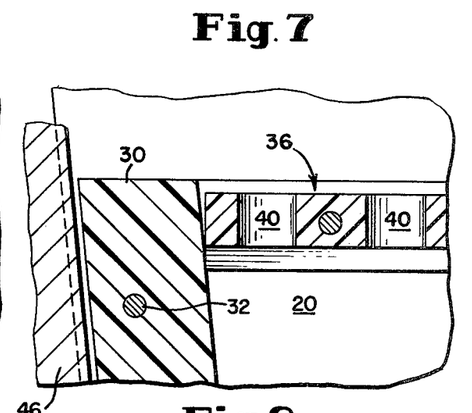
FIG. 7 is a view similar to FIG. 5 but disposed at 90° thereto.

With attention to FIGS. 5 and 7, the upper extension member 36 of frame 30 is also connected to the electrode plates 20 by, preferably, bolts 32. Top member 36 comprises a means for permitting treated water to flow from between electrodes 20, upwardly. However, if a turbulent bed of, for example, graphite particles is utilized between the electrodes 20 it will be necessary to permit the passage of treated water while retaining the bed between the electrodes.

As is obvious to those skilled in the art, in a high volume flow rate, it will also be necessary to provide a top member which will not be "blown out" by the force of water passing therethrough. In order to solve this problem, it was discovered that member 36 would have sufficient structural integrity to maintain a bed between the electrodes without substantially inhibiting the flow of water if a series of horizontal grooves 38 are formed in the lower surface thereof. Holes 40 are then drilled through the upper surface until the holes reached the grooves. Member 36 then provides sufficient structural integrity to serve as an upper frame member extending horizontally across the upper portion of each pair of electrodes 20 between vertical, spaced frame members 30.

Figure 6:
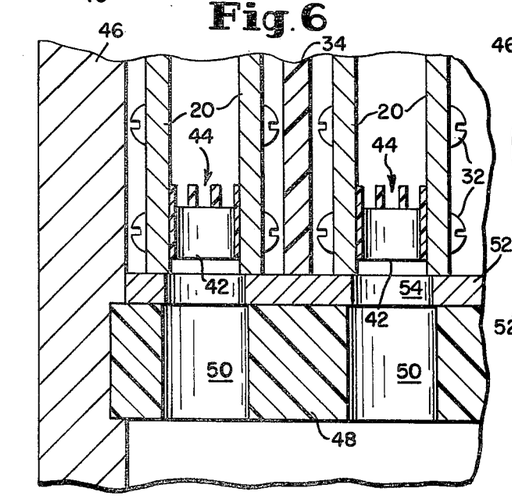
FIG. 6 is a cross section taken along line 6—6 of FIG. 2.
Figure 8:
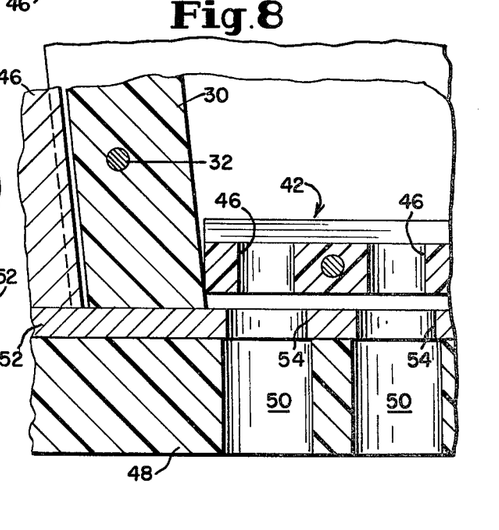
FIG. 8 is a view similar to FIG. 6 but disposed at 90° thereto.

With attention to FIGS. 6 and 8, similarly, a bottom member 42 extends across the bottom portion of each pair of electrodes 20, and is secured by bolts 32. Member 42 has similar horizontally extending grooves 44 in the upper surface thereof and holes 46 extending through the lower surface to meet the lower surface of the grooves 44. Side members 30 and upper and lower members 36 and 42 then frame and separate the electrode plates 20 to form each pair of electrodes as a separate cell assembly.

With attention to FIGS. 2, 6 and 8, the side walls 46 of each module support a base plate 48 which extends therebetween. Plate 48 contains holes 50 which correspond to holes 46 through bottom members 42. A foraminous plate 48 supports a gasket seal 52 which also has holes 54 which correspond with holes 50 in plate 48 and holes 46 in bottom members 42. Each framed pair of electrodes 20 then, as shown in FIG. 6, rests on gasket 52 between barrier members 34 or between a member 34 and a side wall 46 of the module 10, 12 or 14. The gasket 52 acts as a seal then so that individual pairs of electrodes 20 may be removed merely by lifting the entire pair of electrodes out of the module and may be replaced merely by returning the pair of electrodes to its original position within the module. The electrodes then merely rest on the seal during normal operation of the device of this invention. Bottom plate 48 may be constructed of a fiber glass filled polyester material, for example, and the seal member 52 may be of any suitable material including neoprene rubber.

During operation, water to be treated is admitted through pipe 16 to a plenum chamber 60 disposed below each module 10, 12 or 14. Preferably, an access port (not shown) is provided in each inlet chamber 60 to permit removal of any sedimentation which may form in the chamber 60.

If desired, plugs (not shown) may be inserted into holes 46 and bottom members 42 to vary the swirl pattern of water passing between each pair of electrodes 20.

As water is pumped upwardly from inlet chamber 60 through holes 50, 54 and 46, the water enters the intracellular space and rises upwardly between electrodes 20 through a turbulent bed of graphite particles (not shown), if present, and exits through holes 40 in upper member 36. The notch 26 provided at the upper portion of each electrode 20 permits the collection and transfer of treated water through trough 62 to outlet pipe 18.

Water is also permitted to overflow the sides of the electrode cells to fill the space between the outer surfaces of each electrode 20 and the adjacent barrier plate 34 or module side wall 46. The water serves to equalize the pressure within the module so that the electrode plates will not bulge outwardly. The water remains within the modules between plates 34 or walls 46 and electrodes 20 during operation of the device. Although the water in this intercellular space originally flowed between the electrodes, sedimentation therein has not been found to create a substantial maintenance problem.

It should also be noted as shown in FIG. 4, that adjacent electrodes 20 from adjacent cells are connected to the power supply so that they have identical polarities. Thus, there is an insignificant current flow through the water in the intercellular spaces between barriers 34 and the outer surfaces of electrodes 20.

It should also be noted that bolts 32 which serves to assemble the electrode cells separated by frame members 30, 36, and 42, also serve an additional purpose. Bolts 32 are also utilized to align the individual pair of electrodes between barrier plates 34 or between the barrier plate 34 and a side wall 46 of modules 10, 12 or 14.

EXAMPLE

A device of this invention was constructed and successfully tested at a flow rate of about 500 gallons per minute with coal preparation plant water. The device consisted of three modules as shown in FIG. 1, with each module containing 12 sets of electrode cells. The cells then defined 12 separate flow paths through each module. The space between electrodes within a cell was $\frac{5}{8}''$ and the electrode area per flow path therebetween was 7.52 sq. feet. Accordingly, each flow path through each electrode cell had a volume of 0.3917 cubic feet and a flow rate of 13.89 gpm per flow path was established in order to achieve the desired 500 gpm total for three modules. Each flow path or channel had approximately 50% of its volume filled with graphite pellets having dimensions of $\frac{1}{4}''$ by $\frac{1}{8}''$ to $\frac{1}{4}''$. Accordingly, with no fill the residency time at the desired flow rate of 500 gpm would be 12.66 seconds, and with a 50% fill the residence time was approximately 6 seconds.

Each module was separately bussed. Nominal power was 440 volts, 3 phase, and 60 Hz. The modules could alternatively be connected together for a single phase load. The power supply had a maximum continuous rating of 600 amps per phase.

The device of this invention was tested at a variety of flow rates and at different current densities. It was observed, with plain water that no short circuiting or bridging between electrodes occurred at flow rates from 0 to 550 gpm. Maximum fluidization occurred at 12 to 13 gpm and at 15 gpm per flow path or channel the graphite bed remained at the top of the channel. Due to the higher specific gravity of waste water, it would be anticipated that higher flow rates would be necessary for maximum fluidization.

With attention to FIGS. 9-13, the device above described was utilized to treat ponded thickener underflow water from a coal preparation plant. The ponded water had an average suspended solids content of between 308 and 482 ppm. Samples taken near the top of the pond tested at as low as 142 ppm. However, as will be subsequently described, after treatment the discharge from a settling pond met the maximum allowable concentration of 32 ppm in less than 24 hours.

Figure 9:
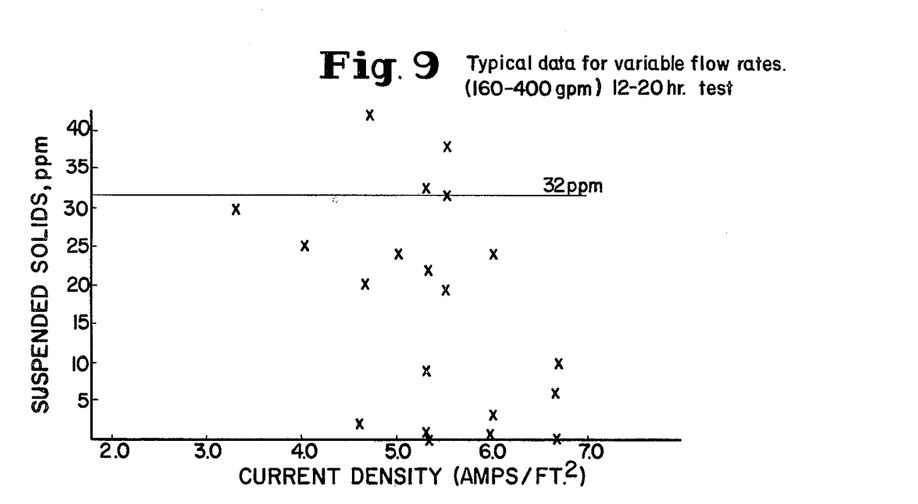
FIG. 9 is a representation of typical data from the process of this invention for variant flow rates between 160 and 400 gallons per minute plotting suspended solids concentration verses current density for a 12 to 20 hour test.

FIG. 9 illustrates test results for a variety of different flow rates and current densities. As will be evident, the current density varied from slightly higher than 3 amps per square foot to slightly less than 7 amps per square foot.

Figure 10:
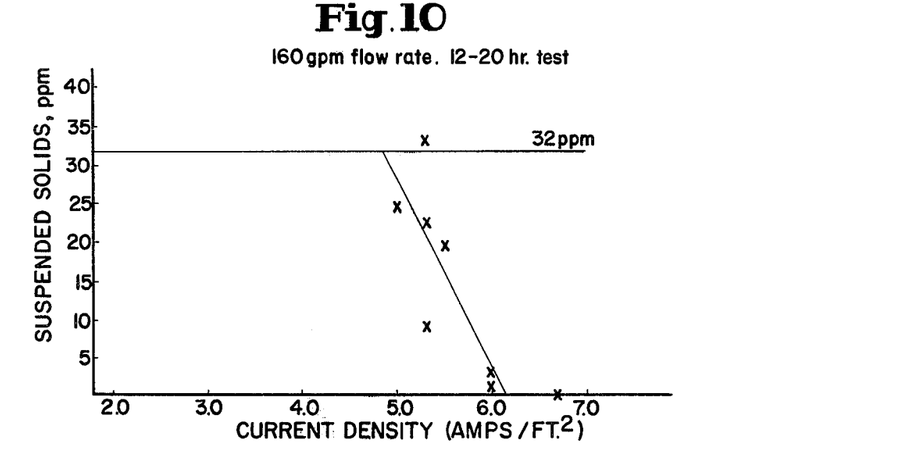
FIG. 10 is a representation similar to FIG. 9 of the suspended solids concentration versus current density for a flow rate of 160 gallons per minute.
Figure 11:
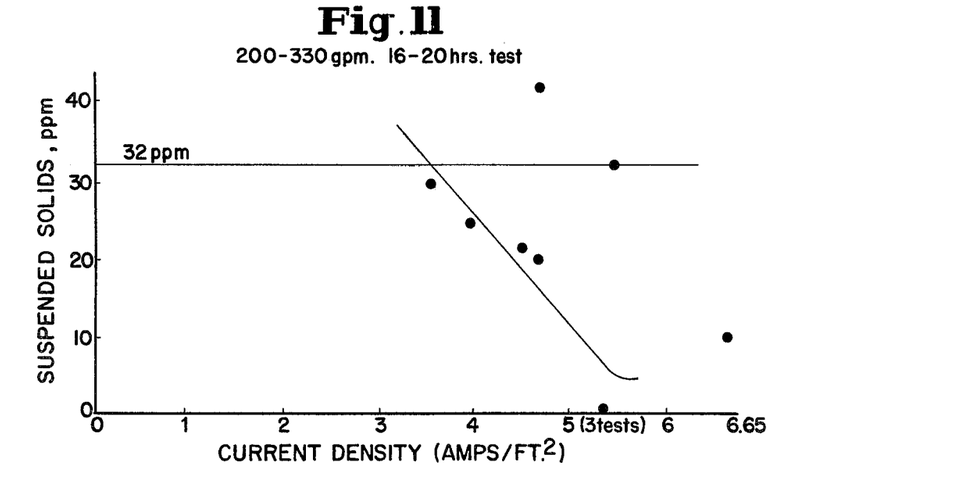
FIG. 11 is a representation similar to FIGS. 9 and 10 of the suspended solids concentration verses current density for a flow rate of 200-300 gallons per minute.

With attention to FIG. 10, this graph illustrates the relationship between suspended solids content and current density at a flow rate 160 gpm. FIG. 11 illustrates a similar test at a higher flow rate of 200 to 330 gpm. The results for FIG. 10 were evaluated after 12 to 20 hours, and the results for FIG. 11 after 16 to 20 hours.

Figure 12:
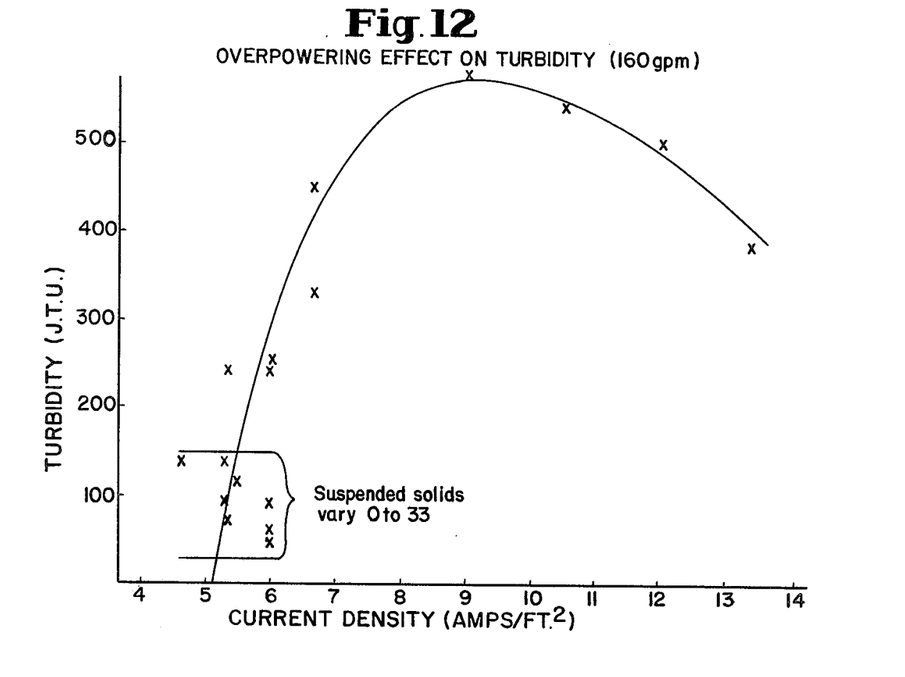
FIG. 12 is a representation of turbidity verses current density for a flow rate of 160 gallons per minute for waste water treated according to the process of this invention.

As is evident from FIGS. 10-12, the process of this invention will adequately treat a relatively high flow rate and achieve the desired suspended solids concentration maximum within 24 hours.

It was discovered, however, that the density of the floc produced was related to current density in the electrode cells. It was discovered that an overpower situation was not desirable in that it produced a floc which was light and fluffy, and quite visible, and which required extended periods to settle. In contrast, at an optimum current density a spherical precipitate was formed which was also quite visible, but settled rapidly. It must be understood that the optimum current density will depend upon the conductivity of the waste water and other factors such as the flow rate, type of suspended solids or contaminants in solution, the specific gravity and the like. It has been discovered, however, that a trial and error type adjustment to current density may be used to establish an optimum. For example, the optimum found with the thickener pond water was between a density of about 4.5 to 6 amps per square foot. However, adequate densities were produced in the range of 2.21 to 6.65 amps per square foot and even in an overpower situation the floc produced ultimately settled out of solution. Tests were conducted, as shown in FIG. 12, at current densities up to 13 amps per square foot to evaluate the overpower situation.

It was discovered that the optimum current density may be achieved as follows:

The production of a light and fluffy floc at an overpower situation, as noted above, may be observed, and it is also possible to observe generation of a spherical floc at the optimal current density. Accordingly, initially the device of this invention was set at a relatively high current density and a low flow rate therethrough. The treated water was observed for the first break of solids to the bottom and clarity of top water and density of floc. If the water cleared but the floc was fine, the flow was increased, or the current decreased. If the flow of water treated exhibited cloudiness which cleared with time, the flow rate was increased to increase the density of the precipitate. If the top water remained cloudy or dirty and did not readily clear, the current density was increased until the top water began to clear.

As noted above, the coal preparation plant flow to the thickener was also treated according to the process of this invention without a fluidized or turbulent bed of graphite particles. It was discovered that equivalent resistance could be achieved as well as adequate scrubbing of the electrodes by a turbulent flow of this water. As noted above, the thickener water contained, in addition to colloidal clay, particles of coal, slate, and the like. These particles were found to achieve the lower resistance desired and the scrubbing effect necessary to operate the device of this invention on a continuous basis.

It must be emphasized, however, that the device could also be operated with the graphite bed provided that the power is shut down before the flow therethrough is stopped, and that the channels or flow paths are flushed with water immediately after a shut-down.

The device of this invention was also operated successfully at a 500 gpm flow rate. In addition, it was operated at a higher flow rate of up to 600 gpm when the water to be treated was relatively free of heavy suspended solids. Maintenance of the device also was acceptable in that the electrode assemblies were easily removed for inspection, maintenance, or replacement. If a flow blockage occurred, the entire pair of electrodes in the assembly frame were lifted from the module and a new pair of electrodes in an assembly dropped into the module in its place.

With the power off and flow continuing, blockages were also eliminated by inserting a rod into the channel and agitating the compacted material. When a fluidized bed is not used the top retaining member 36 is not needed and is removed. Without member 36 the rod may be easily inserted into the channel to eliminate blockages.

Figure 13:
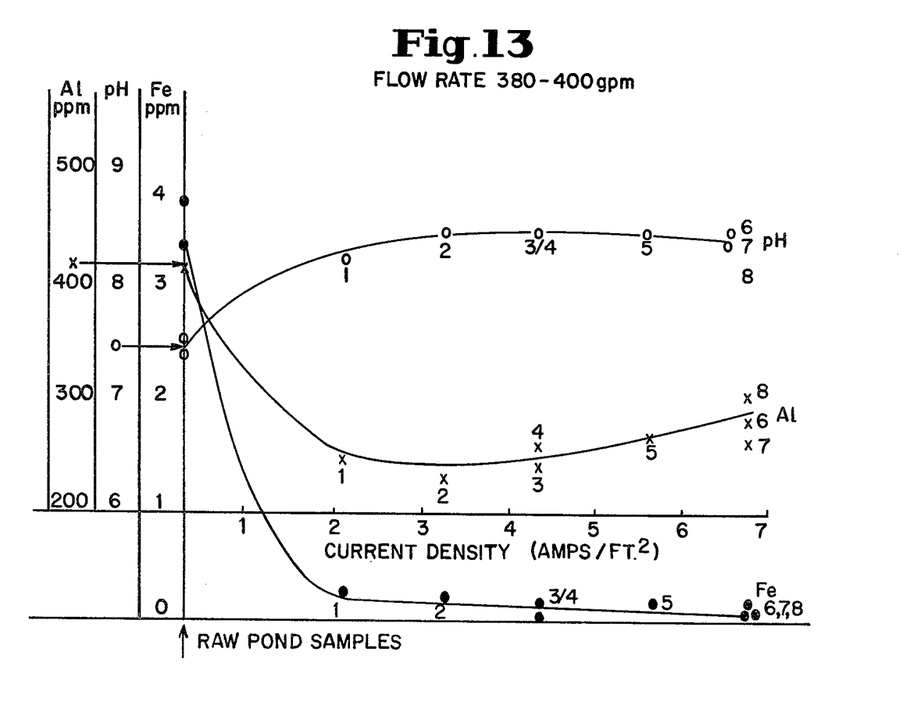
FIG. 13 is a representation of pH and iron and aluminum concentrations of water treated according to the process of this invention at different current densities.

With attention to FIG. 13, the samples evaluated in FIGS. 9–12 were also tested for aluminum, iron and pH. As shown, both aluminum and iron concentrations decreased and pH increased. The aluminum concentration was present in the pond water, and did not come from the electrodes as no degeneration was observed, visually.

Further tests were conducted to evaluate the effect of the process of this invention on pH and heavy metals content including manganese. Table I below illustrates data from electrocoagulation of a neutral pH Mine Acid Stream.

TABLE I

| Test | Raw Water* | Decant after Electro-Coagulation and Aeration |
|---|---|---|
| pH | 6.4 | 7.7 |
| Soluble Iron (ppm) | 88 | 0.13 |
| Total Iron (ppm) | 285 (suspended solids) | 263 (in bottom sludge) |
| Suspended Solids (ppm) | 197 | 1 |
| Dissolved Solids (ppm) | 13,243 | 13,451 |
| Sulfate (ppm) | 8,160 | 8,030 |
| Alkalinity (ppm) | 452 | 540 |
| Manganese (ppm) | 3.0 | 1.9 |
| Aluminum (ppm) | 0.1 | 0.1 |

*Sample aged and slightly oxidized.

Table II below illustrates data from ponded water discharged from an air shaft hole during drilling and cementing. The hole was 15 feet in diameter and 612 feet deep and contained water used as a drill lubricant, chip removal and inflow from the underground water table before hole was encased in cement.

TABLE II

| Test | Control | Creek Discharge Light Slurry | Creek Discharge Heavy Slurry |
|---|---|---|---|
| pH | 7.3 | 8.3 | 8.7 |
| Suspended Solids (ppm) | 195,000 | 15 | 34 |
| Disssolved Solids (ppm) | 7,212 | 3,344 | 3,782 |
| Acidity (ppm) | — | — | — |
| Alkalinity (ppm) | 48,500 | 400 | 387 |
| Total Organic Carbon (ppm) | 11,000 | 30 | 21 |
| Aluminum (Al) (ppm) | 304 | 0.8 | 1.3 |
| Iron (Total) (Fe) (ppm) | 3,500 | 0.18 | 1.82 |
| Manganese (Mn) (ppm) | 104 | 0.02 | 0.08 |
| Specific Gravity | 1.1 | 1.0 | 1.0 |
| Sulfate ($SO_4$—2) (ppm) | 250 | 300 | 260 |

In summary, then, the device of this invention achieves the desired high flow rate in a system having very closely spaced electrodes whereby the water or fluid to be treated is subjected to a collapsing alternating current field to break down suspension forces of colloidal particles and eliminate metal contaminants. It was discovered, however, that at the desired flow rate the optimum current density was relatively low. By optimizing current density, the waste water or fluid was suitable for disposal or further usage in less than 24 hours.

The device of this invention achieves the high flow rate on a continuous basis by providing for simplified maintenance. Specifically, the electrodes are disposed therein in individual assemblies so that if clogging occurs the assembly may be merely lifted from the module and replaced without the necessity for dismantling the entire structure. Without a fluidized bed channels can be cleared in place by use of a cleaning rod.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims therefore intended to be embraced therein.

What is claimed and desired to be secured by Letters Patent is:

1. A simplified maintenance electrocoagulator for purifying water or fluids by causing precipitation and/or oxidation of solids or metals to a dewatering sludge for subsequent removal comprising:
    at least one modular housing having bottom, front, rear and side walls and having an inlet for admitting water to be purified and an outlet for water and agglomerated solids;
    a plurality of upstanding, removable electrode assemblies, slidably disposed within said module, each assembly comprising a pair of upstanding metal electrode plates having opposed, closely spaced faces defining a flow path therebetween, insulating frame means interconnecting upstanding edges of said plates and extending laterally across the top and bottom portions thereof, said lateral extensions interconnecting adjacent portions of said electrodes plates and defining a plurality of openings therethrough, the openings being coincident with the flow path defined by the adjacent electrode faces, and means mounted on the upper portion of each electrode for coupling said electrode to a source of alternating current;
    insulating means disposed between adjacent electrode assemblies within said housing for isolating each of said assemblies;
    means carried by said electrocoagulator for directing a flow of water to be purified sequentially through the inlet into said housing, through the lower lateral frame extension of each electrode assembly, through the flow path between electrode faces, through the upper lateral frame extension of each assembly, and subsequently through the outlet of said housing;
    means carried by said electrocoagulator for agitating the water to be purified in the flow path to maintain the water in turbulence while it passes between electrode faces;
    conductive and abrasive means disposed in the flow path in each assembly for enhancing the alternating current field across said electrodes and for scrubbing the electrode faces when water to be purified is directed through the flow paths between said electrodes.

2. The electrocoagulator of claim 1 wherein the inlet is disposed at the bottom of said housing and the outlet at the top with the flow paths extending upwardly therebetween.

3. The electrocoagulator of claim 2 further comprising a lateral support plate disposed within the housing above the inlet and defining with the bottom and lower portions of the side, front and back walls a plenum chamber in communication with the inlet, said support plates normally supporting the electrode assemblies within said housing and having a plurality of holes therethrough in alignment with the openings in the lower lateral extensions of electrode assembly frames; and
    seal means disposed between said support plate and the lower surfaces of said electrode assembly plates whereby when the electrode assemblies are supported by the plate within the housing water to be treated will circulate from the inlet and plenum chamber through the holes in said plate and the openings in said lower lateral extensions and into the flow paths of the assemblies.

4. The electrocoagulator of claim 3 wherein the insulating means comprises a plurality of walls slidably received within the housing, one of said walls disposed between each pair of adjacent electrode assemblies, each wall being supported by the support plate by the lower surface thereof in sealing engagement with the seal means and extending between opposed sidewalls and upwardly to the upper lateral extension of the assembly frame members.

5. The electrocoagulator of claim 4 further comprising pressure equalization means disposed between the outer surface of each electrode plate and the adjacent housing wall or insulating wall for equalizing the internal and external pressure and said plates whereby when water to be treated passes through the flow paths the turbulent pressure thereof will not deform the electrode plates outwardly.

6. The electrocoagulator of claim 5 wherein said pressure equalizing means comprises water occupying the space between each housing wall or insulating wall and the adjacent electrode plate.

7. The electrocoagulator of claim 1 wherein the lateral extensions of said assembly frames comprise elongated bar members having substantially flat upper and lower surfaces one of each surfaces defining a plurality of longitudinal grooves extending the length thereof and of a predetermined depth, one of each other surface defining a plurality of holes extending the length thereof and of a depth to meet the inner surfaces of said grooves whereby water will flow therethrough.

8. The electrocoagulator of claim 7 wherein the conductive and abrasive means disposed in the flow path comprises a particulate bed.

9. The electrocoagulator of claim 8 wherein the bed comprises graphite rods having diameters of about $\frac{1}{8}$ inch and lengths of about $\frac{1}{8}$ to about $\frac{1}{4}$ inches.

10. The electrocoagulator of claim 8 wherein the bed volume is about 50 percent of volume between electrodes in each assembly.

11. The electrocoagulator of claim 7 wherein the conductive and abrasive means comprises particulate materials entrained in the water or fluid to be purified.

12. A continuous method for agglomerating solids suspended in water to purify said water comprising:
    providing at least one modular housing, an inlet and an outlet, and a plurality of pairs of metal electrodes removably mounted therein between the inlet and outlet, each pair of electrodes having substantially parallel facing surfaces closely spaced with respect to one another defining a flow path between each of said pairs;

directing said water to be purified serially through the inlet, through the electrode assemblies between said adjacent electrode faces in turbulent flow and subsequently through the outlet;

causing the suspended solids to agglomerate by applying an alternating (AC) voltage at a frequency of from about 0.2 Hz to 800 Hz across each of said pairs of electrodes;

controlling the AC voltage in relation to the spacing between adjacent electrodes faces and the conductivity of the water to be purified so as to provide an alternating current flowing between each pair of electrodes surfaces through said flow path effective to precipitate substantially all of the suspended solids in a grain-like precipitate that will settle out of said water, and to provide metallic element removal by oxidation, copreciptation magnetic elimination or distortion within 24 hours or less after said water to be purified passes through the flow paths between said electrodes faces.

13. The method of claim 12 wherein the alternating current between said electrode faces across the flow paths has a density of at least about 2.2 amperes per square foot of electrode surface.

14. The method of claim 13 wherein said current density is no more than about 7 amperes per square foot of electrode surface.

15. The method of claim 12 wherein the alternating current between said electrode faces across the flow paths has a density of no more than about 14–15 amperes per square foot of electrode surface.

16. The method of claim 12 wherein the flow of water to be purified is directed between each pair of electrode faces at a flow rate of up to about 15–20 gallons per minute.

17. The method of claim 16 wherein each of said adjacent electrode faces are spaced about ⅜ inches apart.

18. The method of claim 17 wherein the residence time for water to be purified in the flow path between a pair of adjacent electrodes is from about 6 to about 13 seconds.

19. The method of claim 18 wherein 12 flow paths between adjacent electrode faces are provided per module.

20. The method of claim 19 wherein three of said modules are provided and a flow rate of about 500–600 gallons per minute of water to be purified is directed through the flow paths therein.

* * * * *